United States Patent
Tsukagoshi et al.

(10) Patent No.: US 9,206,770 B2
(45) Date of Patent: Dec. 8, 2015

(54) PURGE METHOD OF CANISTER IN FFV, AND PURGE MECHANISM OF CANISTER IN FFV USING THE METHOD

(75) Inventors: Takahiro Tsukagoshi, Susono (JP); Kouji Morita, Mishima (JP); Kazuhisa Matsuda, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 242 days.

(21) Appl. No.: 14/006,152

(22) PCT Filed: May 10, 2011

(86) PCT No.: PCT/JP2011/060766
§ 371 (c)(1),
(2), (4) Date: Sep. 19, 2013

(87) PCT Pub. No.: WO2012/153392
PCT Pub. Date: Nov. 15, 2012

(65) Prior Publication Data
US 2014/0058648 A1    Feb. 27, 2014

(51) Int. Cl.
*F02M 25/08* (2006.01)
*F02D 13/02* (2006.01)
(Continued)

(52) U.S. Cl.
CPC ........... *F02M 25/08* (2013.01); *F02D 13/0234* (2013.01); *F02D 19/084* (2013.01);
(Continued)

(58) Field of Classification Search
CPC ... F02D 19/08; F02D 19/084; F02D 41/0025; F02M 25/08; F02M 25/0854; Y02T 10/36
USPC .......... 701/102–105, 112, 114; 123/516–521, 123/1 A, 27 GE, 525, 527, 575–577, 697
See application file for complete search history.

(56) References Cited

U.S. PATENT DOCUMENTS 4,446,838 A * 5/1984 Suzuki ................. F02M 25/089
123/519
5,231,969 A * 8/1993 Suga ................... F02D 19/0628
123/1 A
(Continued)

FOREIGN PATENT DOCUMENTS

JP    58-119956 A    7/1983
JP    05-156973 A    6/1993
(Continued)

*Primary Examiner* — John Kwon
*Assistant Examiner* — Johnny H Hoang
(74) *Attorney, Agent, or Firm* — Sughrue Mion, PLLC

(57) ABSTRACT

In an FFV (flexible fuel vehicle) on which an internal-combustion engine using alcohol blended fuel in mounted, the remaining amount of fuel vapor presumed to remain in a canister in accordance with a usual purge processing is presumed based on an alcohol concentration in the alcohol blended fuel. According to this remaining amount, the size of the tank side channel which is a channel in a canister near the connection section with a connection pathway (tank line) with a fuel tank is adjusted by a canister throttle control means, and/or, the timing of opening and closing of an intake valve is changed by a variable valve timing mechanism. Thereby, the desorption rate (the amount of desorption) of fuel vapor from adsorption material in a canister is adjusted, and the concentration of the fuel included in purge gas is adjusted. As a result, even when the change of the remaining amount of the fuel vapor adsorbed by the adsorption material in the canister and/or the uneven concentration distribution of an alcohol component within the canister occur, the accuracy of an air/fuel ratio control in the FFV can be raised, and the discharge of a toxic substance can be suppressed effectively.

8 Claims, 7 Drawing Sheets

(51) Int. Cl.
  *F02D 19/08* (2006.01)
  *F02D 41/00* (2006.01)
(52) U.S. Cl.
  CPC ......... *F02D41/0025* (2013.01); *F02M 25/089* (2013.01); *F02M 25/0854* (2013.01); *Y02T 10/18* (2013.01); *Y02T 10/36* (2013.01)

(56) References Cited

U.S. PATENT DOCUMENTS

| | | | | |
|---|---|---|---|---|
| 2009/0205622 A1* | 8/2009 | Kawakita | ............ | F02D 41/0025 123/672 |
| 2010/0031941 A1* | 2/2010 | Hokuto | ............... | F02D 41/0025 123/575 |
| 2010/0065031 A1* | 3/2010 | Kitada | ................ | F02D 41/0025 123/690 |
| 2012/0031374 A1* | 2/2012 | Hokuto | ................ | F02D 35/027 123/445 |

FOREIGN PATENT DOCUMENTS

| | | |
|---|---|---|
| JP | 2007-192052 A | 8/2007 |
| JP | 2007-285239 A | 11/2007 |
| JP | 2007-309196 A | 11/2007 |
| JP | 2009-287395 A | 12/2009 |
| JP | 2010-096118 A | 4/2010 |
| JP | 2010-209751 A | 9/2010 |

* cited by examiner

PURGE METHOD OF CANISTER IN FFV, AND PURGE MECHANISM OF CANISTER IN FFV USING THE METHOD

CROSS REFERENCE TO RELATED APPLICATIONS

This application is a National Stage of International Application No. PCT/JP2011/060766 filed May 10, 2011, the contents of all of which are incorporated herein by reference in their entirety.

TECHNICAL FIELD

The present invention relates to a method for promoting purge according to increase of the remaining amount of fuel vapor in a canister accompanying increase of the ratio of alcohol component in alcohol blended fuel in an FFV (Flexible Fuel Vehicle). Moreover, the present invention relates also to a purge mechanism of a canister in an FFV using the method.

BACKGROUND ART

Generally, a fuel tank of a vehicle with an internal-combustion engine as a driving source is disposed near an exhaust pipe in many cases and, for this reason, the fuel tank is heated by the heat from the exhaust pipe, etc. Moreover, the surface of the fuel in the fuel tank tends to change due to a shake and vibration while a vehicle is moving. From such a situation, an evaporative emission of fuel (henceforth, may be referred to as "fuel vapor") is likely to be generated in a fuel tank. For this reason, a passage communicated with the external world, the (henceforth, may be referred to as an "air line"), etc. is provided in a fuel tank in order to avoid the rise of the pressure in the fuel tank resulting from fuel vapor. However, it is not preferable that fuel vapor is emitted into the atmosphere (henceforth, may be referred to as an "evaporative emission") from a viewpoint of earth environment protection and/or safety and health.

Then, in order to prevent emitting fuel vapor into the atmosphere, it is known to interpose a canister which houses adsorption material, such as activated carbon, in an air line to make the adsorption material adsorb fuel vapor. When using such a canister, since there is a limit in the adsorption capability of adsorption material, what is referred to as a "purge processing" that desorbs fuel vapor from adsorption material is needed before adsorption material is saturated with fuel vapor. Generally, for example, as shown in FIG. 1, the purge processing is carried out by desorbing fuel vapor from adsorption material with the negative pressure produced in the intake system 20 during the operation of an internal-combustion engine and/or a suction pump (not shown) provided separately, etc. and introducing purge gas containing this desorbed fuel vapor into the intake system 20 of the internal-combustion engine. In FIG. 1, the outlined white arrow expresses an atmosphere (new air) flow, the arrow of a dotted line expresses the flow of fuel vapor, and the arrow of a solid line expresses the flow of the purge gas (fuel vapor+ new air), respectively.

On the other hand, from increasing consciousness to earth environment protection in these days, it is becoming more active to mix alcohol of vegetable origin referred to as "biomass ethanol" and "bioethanol" to conventional gasoline and use as fuel for an internal-combustion engine which is carried, for example, in a vehicle etc. As materials of biomass ethanol, vegetable resources containing a high proportion of carbohydrates or starchy are regarded as suitable and, at present, for example, molasses originating in sugarcane (mainly South America), corn (mainly U.S.), beet (mainly Europe), etc. serve as the main materials of biomass ethanol. Moreover, development of the biomass ethanol which uses plants other than these as materials is also being furthered. Biomass ethanol is positioned as fuel friendly to earth environment based on the view referred to as "carbon-neutral" that even if the fuel which uses these plants as materials is burned and $CO_2$ is generated, it does not necessarily increases the absolute quantity of $CO_2$ of the whole earth, since these plants absorb $CO_2$ in the atmosphere.

As vehicles which can use alcohol blended fuel obtained by mixing bioethanol and conventional gasoline as mentioned above as fuel of an internal-combustion engine, for example, flexible fuel vehicles (FFV), such as an ethanol flexible fuel vehicle, can be mentioned. For example, an ethanol FFV can use alcohol blended fuel which comprises ethanol and gasoline mixed at various ratios as fuel of an internal-combustion engine. In such FFV, a volatilized alcohol component is also contained in the fuel vapor generated in a fuel tank of an internal-combustion engine. Therefore, when using such alcohol blended fuel, the adsorption material of the above-mentioned canister adsorbs fuel vapor containing an alcohol component.

By the way, since alcohol including ethanol has a hydroxy group (OH group) which is a polar group, their polarity is strong, and an alcohol component is more likely to be adsorbed by adsorption material in a canister and less likely to be desorbed, as compared with conventional fuel components, such as gasoline. As a result, for example, as shown in FIG. 2, an alcohol component is likely to accumulate in the adsorption material near the entrance from the tank line 31 of the canister 20 (high concentration domain 36), and the concentration distribution of the alcohol component within the canister 30 becomes uneven. In FIG. 2, the arrow of a black solid line expresses the flow of the fuel vapor which flows from the tank line 31 into the canister 30. Moreover, the domains 37 and 38 express an intermediate concentration domain and a low concentration domain, respectively. In addition, the reference signs 32 and 33 in the figure express an air line and a purge line, respectively. Thereby, the ratio of an alcohol component in the gas introduced into an intake system at the time of a purge processing (henceforth, may be referred to as "purge gas") and the concentration as the whole fuel vapor contained in the purge gas change with advance of the purge processing.

Moreover, when the ratio of an alcohol component in alcohol blended fuel changes, the ratio of the alcohol component in the fuel vapor to be adsorbed by adsorption material in a canister also changes accordingly. Since an alcohol component is less likely to be desorbed from adsorption material as compared with gasoline etc. as mentioned above, when the ratio of the alcohol component in the fuel vapor to be adsorbed by the adsorption material in a canister changes, the desorption rate (amount of desorption) as the whole fuel vapor at the time of a purge processing of the canister will also change. For this reason, when the ratio of an alcohol component in alcohol blended fuel is changed, by using alcohol blended fuel with a different ratio of an alcohol component, or as the ratio of an alcohol component falls by evaporation in prolonged storage, etc., the quantity of the fuel vapor which desorbs from adsorption material at the time of a purge processing of a canister changes and it becomes difficult to estimate correctly the quantity of the fuel vapor introduced into an intake system.

As mentioned above, an alcohol component in alcohol blended fuel has high polarity, is likely to be adsorbed by adsorption material in a canister and less likely to be desorbed. As a result, an uneven concentration distribution of the alcohol component within the canister will arise, and the concentration as the whole fuel vapor and/or the ratio of the alcohol component which are contained in purge gas will change with advance of the purge processing. Moreover, when the ratio of an alcohol component in alcohol blended fuel is changed, the ratio of the alcohol component in the fuel vapor to be adsorbed by adsorption material in a canister will be also changed. As a result, since the desorption rate (the amount of desorption) as the whole fuel vapor at the time of a purge processing of the canister also changes, it becomes difficult to estimate correctly the quantity of the fuel vapor introduced into an intake system at the time of a purge processing of the canister. From the above, there is a possibility that deviation of an air/fuel ratio may arise and it may become impossible to suppress effectively toxic substance contained in exhaust gas (emission suppression).

On the other hand, in the vehicles with a continuously variable transmission (CVT: Continuously Variable Transmission) mounted thereon, an internal-combustion engine is often used in a high load operating range, and intake negative pressure is small in this range. Furthermore, in a hybrid vehicle (HV), since it comprises a driving source other than an internal-combustion engine (for example, electric motor etc.), the operation period of an internal-combustion engine is short or there is a few opportunities to operate the engine and, as a result, there is a few opportunities itself to carry out a purge processing since there is a few opportunities for an internal-combustion engine to fully be warmed up. Therefore, especially in these vehicles, it is difficult to certainly desorb fuel vapor adsorbed by adsorption material in a canister, and fuel vapor containing an alcohol component is likely to remain adsorbed by adsorption material. As a result, there is a possibility that adsorption material may be saturated with fuel vapor, fuel vapor from a fuel tank bypasses a canister without being once adsorbed in a canister (canister breakthrough) to flow out into the atmosphere (that is, "evaporative emission suppression" may get worse).

As the above, in an internal-combustion engine which uses alcohol blended fuel, an alcohol component contained in fuel vapor has a high polarity and therefore is more likely to be adsorbed by adsorption material in a canister and less likely to be desorbed, as compared with conventional fuel components, such as gasoline. As a result, there is a possibility that above-mentioned "emission suppression" and "evaporative emission suppression" may get worse. However, in the art, although measures against the problem that the alcohol component contained in fuel vapor from alcohol blended fuel degrades the material of the outer shell (for example, microcapsule etc.) of thermal storage medium disposed in a canister to reduce its thermal storage effect (for example, refer to Patent Literature 1 (PTL 1) and Patent Literature 2 (PTL 2)) and measures against the problem that fuel vapor becomes more likely to be generated due to the azeotropy of an alcohol component and a gasoline component and thereby the fuel concentration in purge gas becomes too high at the start of a purge processing of a canister (for example, refer to Patent Literature 3 (PTL 3)) have been proposed, it is a reality that any effective measure against the aggravation of the emission suppression and/or evaporative-emission suppression resulting from deviation of an air/fuel ratio produced due to the high polarity of the alcohol component as mentioned above, has not yet been proposed.

CITATION LIST

Patent Literature

[PTL 1] Japanese Patent Application Laid-Open (kokai) No. 2010-96118
[PTL 2] Japanese Patent Application Laid-Open (kokai) No. 2009-287395
[PTL 3] Japanese Patent Application Laid-Open (kokai) No. S58-119956

SUMMARY OF INVENTION

Technical Problem

As mentioned above, an alcohol component in alcohol blended fuel has a high polarity, is likely to be adsorbed by adsorption material in a canister and unlikely to be desorbed. As a result, an uneven concentration distribution of an alcohol component within a canister will arise, and the concentration as the whole fuel vapor and/or the ratio of the alcohol component which are contained in purge gas will change with advance of a purge processing. Moreover, when the ratio of an alcohol component in alcohol blended fuel changes, the ratio of the alcohol component in the fuel vapor to be adsorbed by adsorption material in a canister will also change. As a result, since the desorption rate (the amount of desorption) as the whole fuel vapor at the time of a purge processing of the canister also changes, it becomes difficult to estimate correctly the quantity of the fuel vapor introduced into an intake system at the time of a purge processing of the canister. From the above, there is a possibility that deviation of an air/fuel ratio may arise and it may become impossible to suppress effectively toxic substance contained in exhaust gas (emission suppression).

Furthermore, in vehicles with CVT mounted thereon or HV, since there is a few opportunities itself to carry out a purge processing, it is difficult to certainly desorb fuel vapor adsorbed by adsorption material of a canister, and fuel vapor is likely to remain adsorbed by the adsorption material. This tendency becomes more remarkable when using alcohol blended fuel which is fuel containing an alcohol component. As a result, the canister breakthrough resulting from the saturation of the adsorption material by such fuel vapor likely to happen, and there is a possibility that fuel vapor may flow out into the atmosphere (evaporative emission suppression may get worse).

Therefore, in an internal-combustion engine which uses alcohol blended fuel, it is pressing need to establish a method for carrying out an air/fuel ratio control with high accuracy in the internal-combustion engine and suppress discharge of a toxic substance effectively even if the change of remaining amount of fuel vapor in a canister accompanying the change of the ratio of an alcohol component in alcohol blended fuel and/or an uneven concentration distribution of an alcohol component within a canister occur.

The present invention has been accomplished in order to cope with such a subject, and its objective is to provide a method and mechanism for carrying out an air/fuel ratio control with high accuracy in an internal-combustion engine and suppress discharge of a toxic substance effectively even if the change of remaining amount of fuel vapor in a canister accompanying the change of the ratio of an alcohol component in alcohol blended fuel and/or an uneven concentration distribution of an alcohol component within a canister occur, in an FFV (flexible fuel vehicle) on which the internal-combustion engine using alcohol blended fuel is mounted.

Solution to Problem

The above-described objective of the present invention can be attained by,
a purge method of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine, and
a canister which comprises a purge line being a pathway communicated with an intake system of said internal-combustion engine, a tank line being a pathway communicated with said fuel tank, and an air line communicated with the external world, and houses adsorbent therein, and
characterized in that:
said FFV further comprises;
a canister throttle control means to control the size of a tank side channel which is a channel inside said canister near the connection section with said tank line,
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and
said method includes;
an alcohol concentration detection step in which the alcohol concentration in the alcohol blended fuel stored in said fuel tank is detected by said alcohol concentration detection means,
a remaining fuel amount presumption step in which said remaining fuel amount is presumed by said remaining fuel amount presumption means based on said alcohol concentration, and
a canister throttle control step in which said tank side channel is adjusted by said canister throttle control means so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

Moreover, above-described objective of the present invention can be attained by,
a purge mechanism of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine, and
a canister which comprises a purge line being a pathway communicated with an intake system of said internal-combustion engine, a tank line being a pathway communicated with said fuel tank, and an air line communicated with the external world, and houses adsorbent therein, and
characterized in that:
said FFV further comprises;
a canister throttle control means to control the size of a tank side channel which is a channel inside said canister near the connection section with said tank line,
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and
said canister throttle control means is configured so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

Advantageous Effects of Invention

In accordance with the present invention, even if the change of remaining amount of fuel vapor in a canister accompanying the change of the ratio of an alcohol component in alcohol blended fuel and/or an uneven concentration distribution of an alcohol component within a canister occur, in an FFV on which an internal-combustion engine using alcohol blended fuel is mounted, the desorption rate (the amount of desorption) of fuel vapor from adsorption material in a canister is adjusted according to the remaining amount of the fuel vapor adsorbed by the adsorption material in the canister. Thereby, the concentration of the fuel included in purge gas is appropriately adjusted, the accuracy of an air/fuel ratio control in the FFV is raised, and discharge of toxic substance from said FFV is suppressed effectively.

DESCRIPTION OF EMBODIMENTS

Figure 1:
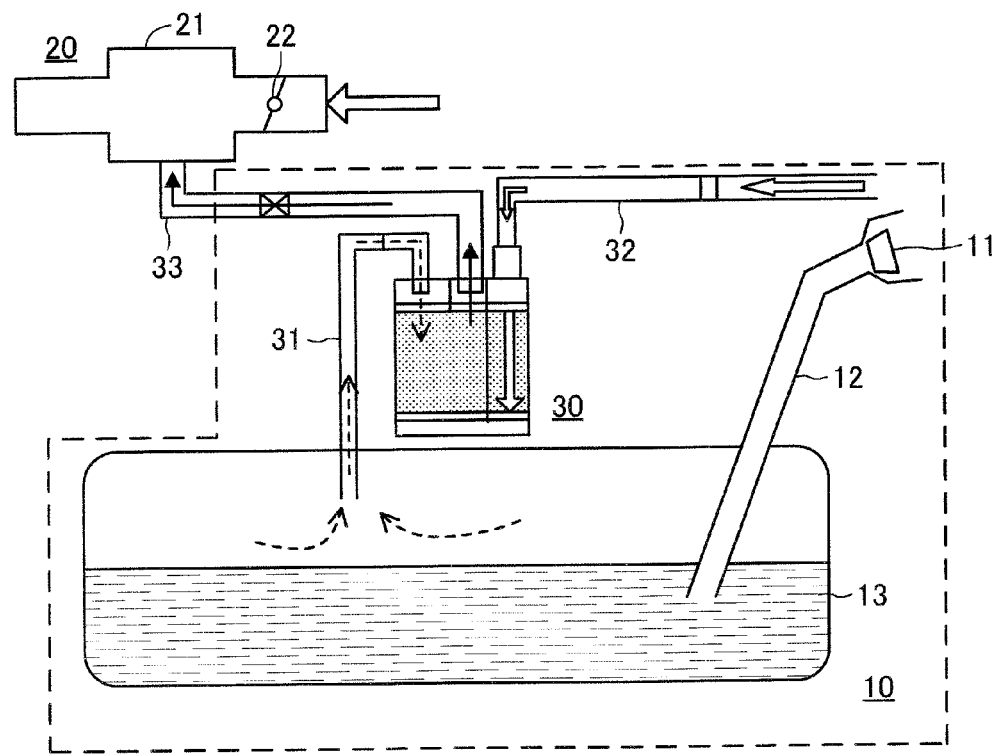
FIG. 1 A schematic view showing a purge mechanism of a canister according to a conventional technology.
Figure 2:
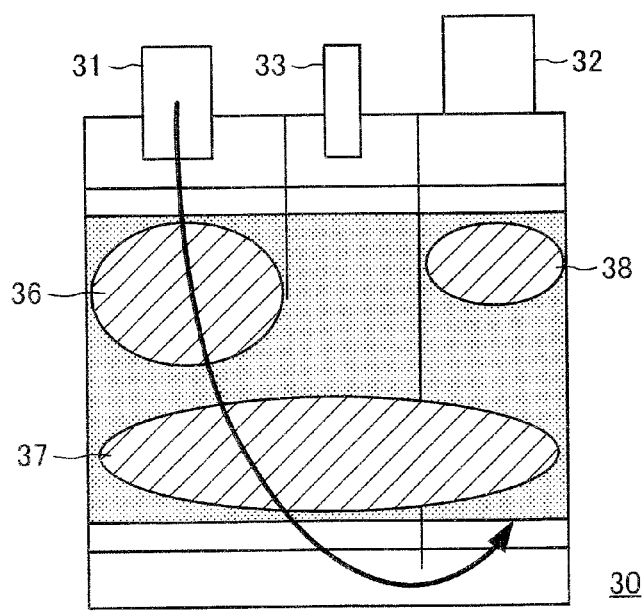
FIG. 2 A schematic view showing an uneven concentration distribution of an alcohol component in a canister.

As mentioned above, the present invention is intended to provide a method and mechanism for improving the accuracy of an air/fuel ratio control in an FFV (flexible fuel vehicle) on which an internal-combustion engine using alcohol blended fuel is mounted and effectively suppressing discharge of a toxic substance even if the change of remaining amount of fuel vapor in a canister accompanying the change of the ratio of an alcohol component in the alcohol blended fuel and/or an uneven concentration distribution of an alcohol component within the canister occur in the FFV.

As a result of wholehearted research for achieving the above-mentioned objective, the present inventors have found that the accuracy of an air/fuel ratio control in an FFV (flexible fuel vehicle) on which an internal-combustion engine using alcohol blended fuel is mounted can be improved and discharge of a toxic substance can be effectively suppressed by adjusting the desorption rate (the amount of desorption) of fuel vapor from adsorption material in a canister according to the remaining amount of an alcohol component in fuel vapor adsorbed by the adsorption material in the canister even if the change of remaining amount of fuel vapor in a canister accompanying the change of the ratio of an alcohol component in the alcohol blended fuel and/or an uneven concentration distribution of an alcohol component within the canister occur in the FFV, and have come to conceive the present invention.

Namely, the first embodiment of the present invention is,
a purge method of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine, and
a canister which comprises a purge line being a pathway communicated with an intake system of said internal-combustion engine, a tank line being a pathway communicated with said fuel tank, and an air line communicated with the external world, and houses adsorbent therein, and
characterized in that:
said FFV further comprises;
a canister throttle control means to control the size of a tank side channel which is a channel inside said canister near the connection section with said tank line,
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and
said method includes;
an alcohol concentration detection step in which the alcohol concentration in the alcohol blended fuel stored in said fuel tank is detected by said alcohol concentration detection means,
a remaining fuel amount presumption step in which said remaining fuel amount is presumed by said remaining fuel amount presumption means based on said alcohol concentration, and
a canister throttle control step in which said tank side channel is adjusted by said canister throttle control means so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

As mentioned above, a FFV (flexible fuel vehicle) to which a purge method of a canister according to the first embodiment of the present invention is applied has an internal-combustion engine which uses alcohol blended fuel as fuel mounted thereon. As a matter of course, the internal-combustion engine comprises a fuel tank which stores the alcohol blended fuel as fuel, a fuel supply system which supplies fuel from the fuel tank to the internal-combustion engine, etc. In addition, the internal-combustion engine is not limited to any specific configurations as long as alcohol blended fuel can be used as fuel. Therefore, the explanation about the details of an internal-combustion engine is omitted here.

Moreover, a canister is mounted on the above-described FFV, as common vehicles with an internal-combustion engine mounted thereon. As mentioned above, a canister is a mechanism which is interposed in a passage communicating a fuel tank and the external world for avoiding that the pressure in the fuel tank rises with the fuel vapor generated in the fuel tank to make adsorption material housed therein adsorb fuel vapor for preventing the fuel vapor from being emitted into the atmosphere. However, since there is a limit in the adsorption capability of adsorption material, it is necessary to carry out a purge processing before adsorption material is saturated with fuel vapor to desorb fuel component from adsorption material.

Generally, the above-mentioned purge processing is carried out by taking the atmosphere into a canister to desorb a fuel component from adsorption material and introducing purge gas containing the desorbed fuel component into an intake system of an internal-combustion engine. Therefore, a canister comprises a purge line which is a pathway communicating the intake system of the internal-combustion engine with the canister, a tank line which is a pathway communicating a fuel tank with the canister, and an air line which is a pathway communicating the external world with the canister. Moreover, adsorption material for adsorbing the fuel vapor generated in the fuel tank is housed in the canister, as mentioned above.

The above-mentioned adsorption material is not limited to a specific material, as long as fuel vapor can be adsorbed. As an example of the above-mentioned adsorption material, the material which has porous structure, such as activated carbon and zeolite, can be mentioned, for example. As mentioned above, since there is a limit in the adsorption capability of adsorption material, in order to continue preventing fuel vapor from discharging into the atmosphere, it is necessary to carry out a purge processing before adsorption material is saturated with fuel vapor, and to make a fuel component emit from adsorption material, and to recover the adsorption capability of adsorption material.

As mentioned above, the gas in the top space in a fuel tank where the pressure is increased resulting from the fuel vapor generated in the fuel tank usually goes into a canister through a tank line, the gas is adsorbed by the adsorption material in the canister while the gas passes through the inside of the canister, and the gas remained without being adsorbed (fuel vapor was removed) is emitted into the atmosphere through an air line. On the other hand, at the time of a purge processing execution, for example, the atmosphere (new air) is taken into a canister through an air line by negative pressure produced in an intake system at the time of operation of an internal-combustion engine, a suction pump provided separately, etc., a fuel component is desorbed from adsorption material, and the purge gas containing the desorbed fuel component is introduced into an intake system of the internal-combustion engine through a purge line.

The fuel vapor introduced into an intake system of an internal-combustion engine as mentioned above is burnt in a combustion chamber with the fuel injected into the combustion chamber or an inlet port of the internal-combustion engine and inhaled air. That is, the fuel vapor introduced into the intake system of the internal-combustion engine as mentioned above affects the air/fuel ratio in the internal-combustion engine. Therefore, in order to manage an air/fuel ratio strictly and to carry out emission suppression effectively, it is necessary to correctly manage the quantity of the fuel vapor introduced into an intake system of an internal-combustion engine.

However, as mentioned above, since alcohol including ethanol has a hydroxy group (OH basis) which is a polar group, their polarity is strong, an alcohol component is easy to be adsorbed by adsorption material in a canister and hard to be desorbed therefrom, as compared with the conventional fuel components, such as gasoline. As a result, among the ingredients contained in fuel vapor of alcohol blended fuel, an alcohol component is more easily adsorbed by the adsorption material near the entrance of a canister and the concentration distribution of the alcohol component within the canister becomes uneven. Thereby, the ratio of an alcohol component in the purge gas introduced into the intake system of an internal-combustion engine at the time of execution of a purge processing and/or the concentration as the whole fuel vapor contained in the purge gas will change with advance of a purge processing.

Moreover, when the ratio of an alcohol component in alcohol blended fuel is changed, by using alcohol blended fuel with a different ratio of an alcohol component, or as the ratio of an alcohol component falls by evaporation in prolonged storage, etc., the ratio of the alcohol component in the fuel vapor to be adsorbed by adsorption material in a canister also changes accordingly thereto. Since an alcohol component is hard to be desorbed from adsorption material, as mentioned above, as compared with gasoline etc., when the ratio of an alcohol component in the fuel vapor to be adsorbed by adsorption material in a canister changes, the desorption rate (the amount of desorption) as the whole fuel vapor at the time of execution of a purge processing of a canister will also change.

As a result, when a purge processing is performed in an FFV which does not comprise a canister throttle control means, the higher the alcohol concentration in alcohol blended fuel is, the more fuel vapor remains adsorbed by adsorption material without being desorbed from adsorption material (remaining fuel amount increases). Therefore, in a purge method and purge mechanism according to a conventional technology, it becomes difficult to estimate correctly the quantity of the fuel vapor to be introduced into an intake system at the time of execution of a purge processing of a canister. Thereby, deviation of an air/fuel ratio arises and it becomes difficult to suppress effectively toxic substance contained in exhaust gas (emission suppression).

Moreover, fuel vapor is likely to remain adsorbed by adsorption material, in a vehicle with CVT mounted thereon often using an internal-combustion engine in a high load operating range where an intake negative pressure is small, and in a hybrid vehicle (HV) in which there is a few opportunities for an internal-combustion engine to be fully warmed up and therefore there is a few opportunities itself to carry out a purge processing. This tendency becomes more remarkable when using alcohol blended fuel which is the fuel containing an alcohol component. As a result, there is a possibility that adsorption material may be saturated by an alcohol component, a canister breakthrough may occur, and fuel vapor from a fuel tank may bypass a canister to flow out into the atmosphere (evaporative emission suppression may get worse).

As mentioned above, in an internal-combustion engine which uses alcohol blended fuel, the alcohol component contained in fuel vapor is easy to be adsorbed by adsorption material in a canister and hard to be desorbed therefrom due to a high polarity thereof, as compared with a conventional fuel component, such as gasoline. As a result, there is a possibility that deviation of an air/fuel ratio may arise at the time of a purge processing execution and emission suppression and evaporative emission suppression may get worse.

Then, a FFV to which a purge method according to the first embodiment of the present invention is applied further comprises a canister throttle control means to control the size of a tank side channel which is a channel inside said canister near the connection section with said tank line, an alcohol concentration detection means to detect an alcohol concentration in the alcohol blended fuel stored in said fuel tank, and a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means.

The above-mentioned canister throttle control means is a means to widen or narrow the cross-sectional area of the tank side channel which is a channel inside said canister near the connection section with the tank line, as mentioned above. The above-mentioned canister throttle control means is not limited to a specific configuration, as long as it is possible to make wide or narrow the cross-sectional area of the channel of the gas (fuel vapor or purge gas) in a canister. Specifically, as the above-mentioned canister throttle control means, for example, valves, such as a variable throttle whose throttle aperture changes based on a control signal (direction signal) can be mentioned.

Figure 3:
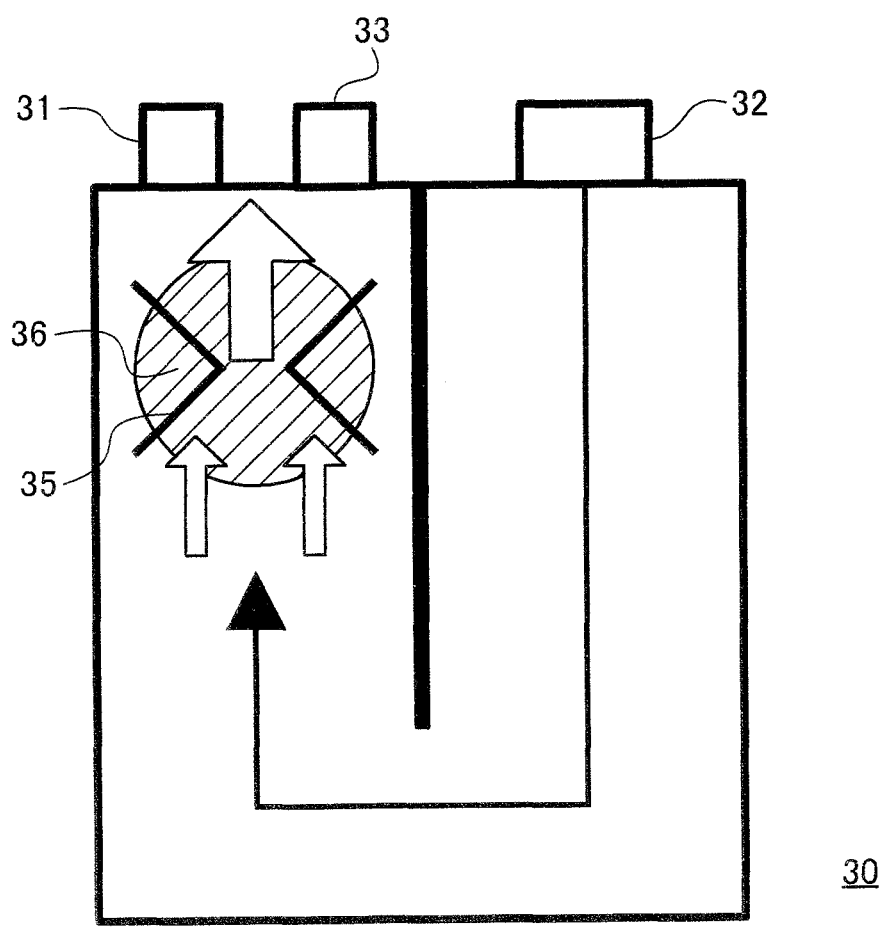
FIG. 3 A schematic view showing the flow of purge gas at the time of execution of a purge method of a canister in an FFV according to one embodiment of the present invention.

When the cross-sectional area of the tank side channel which is a channel in a canister near the connection section with the tank line is narrowed by the canister throttle control means as mentioned above, for example, as expressed by an outlined white arrow shown in FIG. 3, the flow velocity of purge gas increases in the domain in which the cross-sectional area of the tank side channel is narrowed by the canister throttle control means 35 (high concentration domain 36) and, as a result, the desorption rate from the adsorption material of fuel vapor in the domain increases. Thereby, deviation of an air/fuel ratio at the time of a purge processing execution is suppressed, and emission suppression and/or evaporative emission suppression come to be performed effectively.

As mentioned above, since the polarity of an alcohol component is strong among the components contained in fuel vapor of alcohol blended fuel and an alcohol component is likely to be adsorbed by adsorption material in a canister and unlikely to be desorbed therefrom as compared with conventional fuel components, such as gasoline, an alcohol component is easy to be adsorbed by the adsorption material near the entrance of the canister, and the concentration distribution of the alcohol component within a canister becomes uneven. Therefore, by narrowing the tank side channel which is a channel in the canister near the connection section with a tank line as mentioned above, the flow velocity of the purge gas in the portion where the alcohol component is adsorbed at higher concentration can be increased. Thereby, desorption from the adsorption material of the alcohol component adsorbed in the portion is promoted more as compared with other portions, and changes of the concentration of the fuel vapor contained in purge gas and/or the ratio of the alcohol component in the fuel vapor is suppressed more efficiently. From such a reason, the above-mentioned canister throttle control means is provided in the channel inside the canister near the connection section with a tank line.

The above-mentioned alcohol concentration detection means is a means to detect the alcohol concentration in the alcohol blended fuel stored in the fuel tank. The above-mentioned alcohol concentration detection means is not limited to a specific configuration, as long as it is possible to detect the alcohol concentration in the alcohol blended fuel stored in the fuel tank. As the above-mentioned alcohol concentration detection means, for example, a concentration sensor which transmits a detection signal (output signal) according to the alcohol concentration in the alcohol blended fuel stored in the fuel tank, etc. can be mentioned. As such a concentration sensor, sensors of various systems, such as a semiconductor type, an electric capacity type, and a light transmission type, are known, and suitable one can be chosen and used among these.

Moreover, the above-mentioned remaining fuel amount presumption means is a means to presume a remaining fuel amount which is the amount of the fuel which will remain adsorbed by the adsorption material without being desorbed from the adsorption material if a purge processing is performed in an FFV which does not comprise the canister throttle control means, based on the alcohol concentration detected by the above-mentioned alcohol concentration detection means. More specifically, for example, the above-mentioned remaining fuel amount presumption means first presumes (calculates) the amount of fuel vapor adsorbed by the adsorption material housed in the canister based on the alcohol concentration detected by the above-mentioned alcohol concentration detection means, the temperature of the alcohol blended fuel in the above-mentioned fuel tank, and the adsorption efficiency of the adsorption material (for example, activated carbon) housed in the above-mentioned canister. Subsequently, the above-mentioned remaining fuel amount presumption means presumes (calculates) the remaining fuel amount which is the amount of the fuel which will remain adsorbed by the adsorption material without being desorbed from the adsorption material based on the flow velocity etc. of the purge gas in the case where a purge processing is performed in an FFV which does not comprise the canister throttle control means.

Alternatively, the relation between the alcohol concentration detected by the above-mentioned alcohol concentration detection means and the above-mentioned remaining fuel amount corresponding to the alcohol concentration in the case where a purge processing is performed in an FFV which does not comprise the canister throttle control means may be acquired beforehand by a prior experiment etc. and, based on the relation, the remaining fuel amount may be presumed from the alcohol concentration detected by the above-mentioned alcohol concentration detection means.

In an FFV comprising each means as mentioned above, a purge method according to the first embodiment of the present invention includes, an alcohol concentration detection step in which the alcohol concentration in the alcohol blended fuel stored in said fuel tank is detected by said alcohol concentration detection means, a remaining fuel amount presumption step in which said remaining fuel amount is presumed by said remaining fuel amount presumption means based on said alcohol concentration, and a canister throttle control step in which said tank side channel is adjusted by said canister throttle control means so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

In addition, the relation between the remaining fuel amount presumed by the remaining fuel amount presumption means and the throttle aperture of the canister throttle control means corresponding to the remaining fuel amount can be acquired beforehand by a prior experiment etc., for example. Then, in the above-mentioned canister throttle control step, referring to the relation, the throttle aperture of the canister throttle control means suitable for suppressing the changes of the concentration of the fuel vapor contained in purge gas and/or the ratio of the alcohol component in the fuel vapor can be determined, based on the remaining fuel amount presumed by the remaining fuel amount presumption means.

Figure 4:
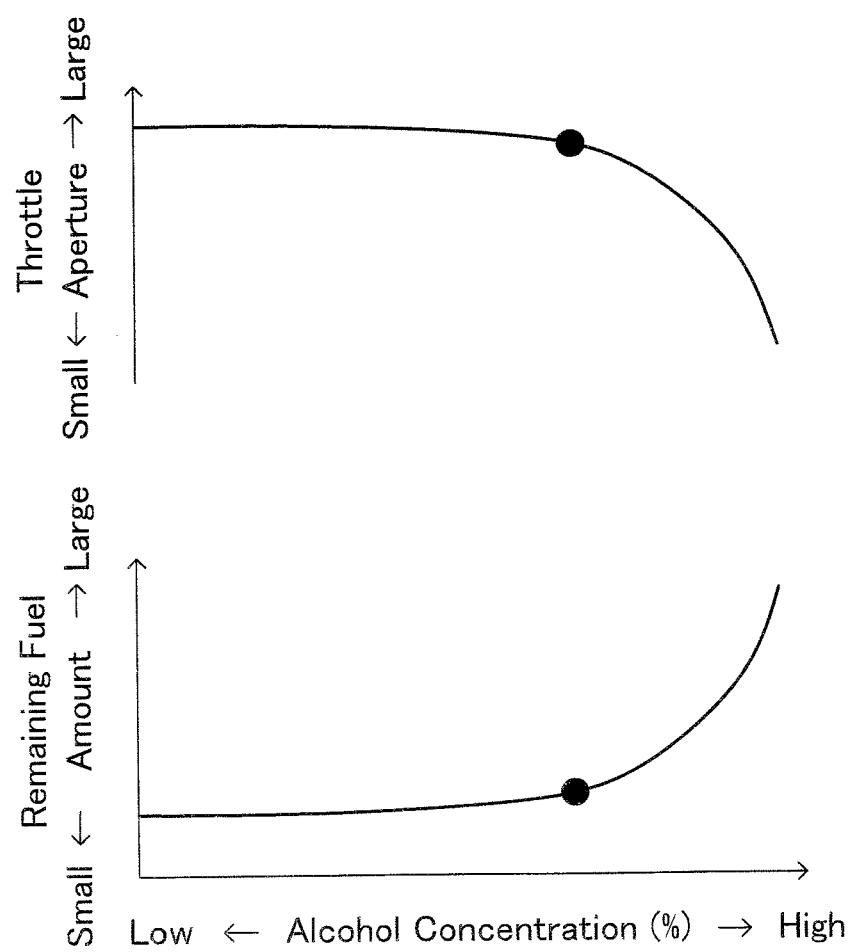
FIG. 4 A graph schematically showing a relation between an alcohol concentration in alcohol blended fuel and the amount of the fuel which will remain in adsorption material (remaining fuel amount) when a conventional purge processing is performed, and a relation between an alcohol concentration in alcohol blended fuel and the throttle aperture of a canister throttle means for promoting the desorption of the fuel from adsorption material corresponding to the remaining fuel amount in one embodiment of the present invention.

FIG. 4 is a graph schematically showing a relation between an alcohol concentration in alcohol blended fuel and the amount of the fuel which will remain in adsorption material (remaining fuel amount) when a conventional purge processing is performed, and a relation between an alcohol concentration in alcohol blended fuel and the throttle aperture of a canister throttle means for promoting the desorption of the fuel from adsorption material corresponding to the remaining fuel amount in one embodiment of the present invention. As shown in FIG. 4, the remaining fuel amount increases as the alcohol concentration in alcohol blended fuel increases, and in the region where alcohol concentration is high (in FIG. 4, a region on the side of high concentration from the point of inflection shown by a black dot on a curve), the increase tendency of the remaining fuel amount is especially remarkable. Corresponding to this, as for the throttle aperture of a canister throttle control means, it is desirable to be controlled so that the throttle aperture of a canister throttle control means may decrease as the alcohol concentration in alcohol blended fuel increases, and the decrease tendency of the throttle aperture is especially remarkable in the region where alcohol concentration is high, contrary to the remaining fuel amount.

By the above, the changes of the ratio of an alcohol component in purge gas and/or the concentration as the whole fuel vapor contained in purge gas with advance of a purge processing, and/or the change of the quantity of fuel vapor introduced into an intake system at the time of execution of a purge processing of a canister when the ratio of an alcohol component in alcohol blended fuel changes can be reduced. Therefore, in accordance with a purge method according to the first embodiment of the present invention, it becomes possible to correctly estimate the quantity of fuel vapor introduced into an intake system at the time of a purge processing. As a result, the accuracy of an air/fuel ratio control of an internal-combustion engine increases, and discharge of a toxic substance comes to be effectively suppressed.

For example, the procedure expressed by the above-mentioned respective steps can be performed by an algorithm stored in an electrical control unit (ECU) which an FFV to which a purge method according to the first embodiment of the present invention is applied comprises. Specifically, for example, a program corresponding to the procedure expressed by the above-mentioned respective steps and a relation between the remaining fuel amount presumed by the remaining fuel amount presumption means and the throttle aperture of the canister throttle control means corresponding to the remaining fuel amount have been memorized in a memory means (for example, ROM, HDD, etc.) with which the ECU is equipped, the ECU receives a detection signal (output signal) from the alcohol concentration detection means through an input port etc. and presumes the remaining fuel amount based on the detection signal and determines a suitable throttle aperture of the canister throttle control means from the above-mentioned relation based on the remaining fuel amount thus presumed, and transmits a control signal (direction signal) corresponding to the determined throttle aperture through an output port etc. from the ECU to the canister throttle control means, and the canister throttle control means adjusts the size of the tank side channel which is a channel in the canister near the connection section with a tank line to suppress the change of the concentration of the fuel vapor contained in purge gas and the ratio of the alcohol component in the fuel vapor.

In addition, when a relation between the alcohol concentration in the alcohol blended fuel in a fuel tank and the remaining fuel amount corresponding to the alcohol concentration in the case of performing a purge processing in an FFV which does not comprise a canister throttle control means has been acquired beforehand, for example, by a prior experiment etc. and the remaining fuel amount is presumed from the alcohol concentration detected by the above-mentioned alcohol concentration detection means based on the relation, instead of calculating the amount of fuel vapor adsorbed to adsorption material housed in a canister from the alcohol concentration detected by an alcohol concentration detection means etc. and calculating the remaining fuel amount from the amount of adsorbed fuel vapor thus calculated as mentioned above, it may be configured so that the relation may be memorized, for example, as a data table (map) in a memory means (for example, ROM, HDD, etc.) with which the ECU is equipped and referred to in the remaining fuel amount presumption step.

As mentioned above, an accordance with a purge method of a canister in an FFV according to the first embodiment of the present invention, when the alcohol concentration detected by an alcohol concentration detection means is high, by narrowing the cross-sectional area of the gas channel near the connection section with the tank line in the canister according to the remaining fuel amount presumed in the remaining fuel amount presumption step, a canister throttle control means increases the flow velocity of the purge gas in the portion. As a result, a desorption of fuel vapor (containing a large amount of the alcohol component) from the adsorption material disposed in the portion at the time of a purge processing execution is promoted. Thereby, the changes of the concentration of fuel vapor in the purge gas resulting from the high polarity of the alcohol component and/or the ratio of the alcohol component in fuel vapor in purge gas as mentioned above are suppressed, more accurate air/fuel ratio control becomes possible, and emission suppression and evaporative emission suppression are performed more effectively.

By the way, in the above-mentioned the first embodiment of the present invention, as a means to adjust the desorption rate of the fuel vapor adsorbed by (adsorption material inside) a canister according to the alcohol concentration (and the remaining fuel amount presumed from the alcohol concentration) detected by an alcohol concentration detection means, a canister throttle control means to control the size of a tank side channel which is a channel in a canister near the connection section with a tank line is provided in the canister. However, a means to adjust the desorption rate of the fuel vapor adsorbed by (adsorption material inside) a canister according to the alcohol concentration (and the remaining fuel amount presumed from the alcohol concentration) detected by an alcohol concentration detection means is not limited to the above, and the desorption rate may be adjusted by means other than the above.

Although a wide variety of types can be assumed as a means to adjust the desorption rate of the fuel vapor adsorbed by (adsorption material inside) a canister according to the alcohol concentration (and the remaining fuel amount presumed from the alcohol concentration) detected by an alcohol concentration detection means, those without enlargement and the complication as the whole system and increase of a manufacturing cost is more preferable. As such a desorption-rate regulation means, for example, those which increase the negative pressure of an intake system by changing valve timing using a variable valve timing mechanism (VVT: Variable Valve Timing) in an FFV equipped with the VVT can be mentioned.

Namely, the second embodiment of the present invention is, a purge method of a canister in an FFV (flexible fuel vehicle), wherein:

said FFV comprises;

an internal-combustion engine which uses alcohol blended fuel as fuel, a fuel tank which stores the fuel to be supplied to said internal-combustion engine, a canister which comprises a purge line being a pathway communicated with an intake system of said internal-combustion engine, a tank line being a pathway communicated with said fuel tank, and an air line communicated with the external world, and houses adsorbent therein, and a variable valve timing mechanism which changes the timing of opening and closing of an intake valve, and characterized in that:

said FFV further comprises;

an alcohol concentration detection means to detect an alcohol concentration in the alcohol blended fuel stored in said fuel tank, and a remaining fuel amount presumption means to presume a remaining fuel amount which is the amount of the fuel which will remain adsorbed by said adsorption material without being desorbed from said adsorption material if a purge processing is performed in an FFV which does not comprise said variable valve timing mechanism, based on the alcohol concentration detected by said alcohol concentration detection means, and said method includes;

an alcohol concentration detection step in which the alcohol concentration in the alcohol blended fuel stored in said fuel tank is detected by said alcohol concentration detection means, a remaining fuel amount presumption step in which said remaining fuel amount is presumed by said remaining fuel amount presumption means based on said alcohol concentration, and a valve timing control step in which the timing of opening of said intake valve is adjusted by said variable valve timing mechanism so that the larger the remaining fuel amount presumed in said remaining fuel amount presumption step is, the later the timing of opening of said intake valve should become, while the smaller the remaining fuel amount presumed in said remaining fuel amount presumption step is, the earlier the timing of opening of said intake valve should become.

The above-mentioned variable valve timing mechanism may be any of mechanisms currently used in the art. For example, the above-mentioned variable valve timing mechanism may be a hydraulic type which changes the phase of the rotation of an engine and the rotation of a cam shaft which drives a valve with oil pressure as a drive source. Moreover, it may be an electromotive type using an electric motor as an actuator.

Moreover, the above-mentioned variable valve timing mechanism delays the timing of opening of an intake valve according to the remaining fuel amount presumed based on the alcohol concentration and generates negative pressure in a combustion chamber of an internal-combustion engine (inside of a cylinder) when the alcohol concentration (and the remaining fuel amount presumed from the alcohol concentration) detected by the above-mentioned alcohol concentration detection means is high. Since the flow velocity of intake gas in an intake system at the time of an intake valve opening increases thereby and the flow velocity of purge gas also increases as a result, the desorption rate of fuel vapor from adsorption material housed in a canister also increases. As a result, also in the present embodiment, the changes of the concentration of fuel vapor in purge gas and/or the ratio of an alcohol component in fuel vapor in the purge gas resulting from high polarity of the alcohol component are suppressed, more accurate air/fuel ratio control becomes possible, and emission suppression and evaporative emission suppression are performed more effectively.

Figure 5:
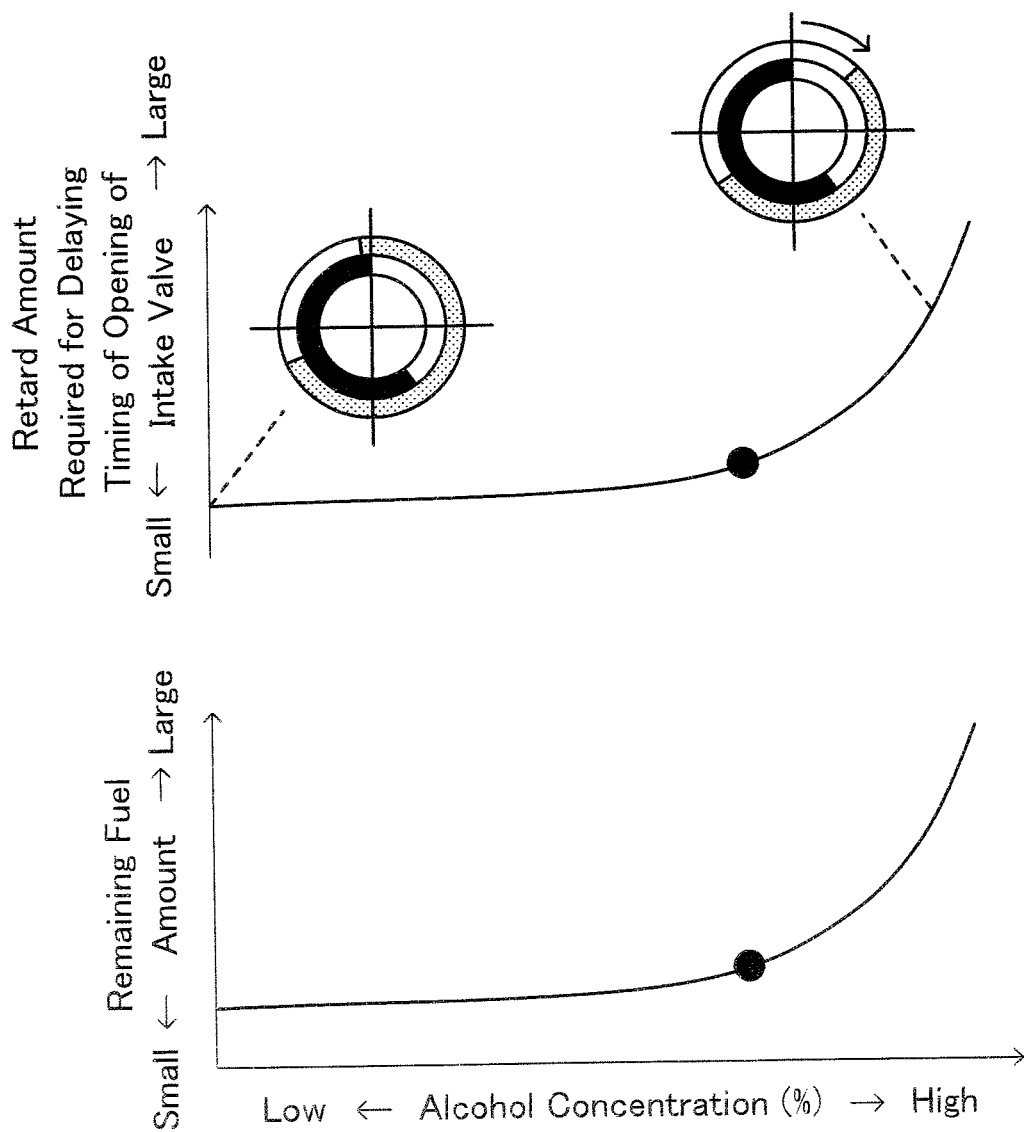
FIG. 5 A graph schematically showing a relation between an alcohol concentration in alcohol blended fuel and the amount of the fuel which will remain in adsorption material (remaining fuel amount) when a conventional purge processing is performed, and a relation between an alcohol concentration in alcohol blended fuel and the retard amount required for delaying the timing of opening of an intake valve in order to promote the desorption of the fuel from adsorption material corresponding to the remaining fuel amount in another embodiment of the present invention.

FIG. 5 is a graph schematically showing a relation between an alcohol concentration in alcohol blended fuel and the amount of the fuel which will remain in adsorption material (remaining fuel amount) when a conventional purge processing is performed, and a relation between an alcohol concentration in alcohol blended fuel and the retard amount required for delaying the timing of opening of an intake valve in order to promote the desorption of the fuel from adsorption material corresponding to the remaining fuel amount in another embodiment of the present invention. As shown in FIG. 5, the remaining fuel amount increases as the alcohol concentration in alcohol blended fuel increases, and in the region where alcohol concentration is high (in FIG. 5, a region on the side of high concentration from the point of inflection shown by a black dot on a curve), the increase tendency of the remaining fuel amount is especially remarkable. Corresponding to this, as for the retard amount required for delaying the timing of opening of an intake valve, it is desirable to be controlled so that the required retard amount may increase as the alcohol concentration in alcohol blended fuel increases, and the increase tendency of the required retard amount is especially remarkable in the region where alcohol concentration is high, similarly to the remaining fuel amount. In addition, two diagrams in a shape of a concentric circle shown in FIG. 5 schematically express the change of the required retard amount at the time of delaying the time of opening of an intake valve as mentioned above.

By the above, the change of the ratio of an alcohol component in purge gas and/or the concentration as the whole fuel vapor contained in purge gas with advance of a purge processing and/or the change of the quantity of the fuel vapor introduced into an intake system at the time of execution of a purge processing of a canister when the ratio of an alcohol component in alcohol blended fuel changes can be reduced. Therefore, in accordance with a purge method according to the second embodiment of the present invention, it becomes possible to correctly estimate the quantity of the fuel vapor introduced into an intake system at the time of a purge processing. As a result, the accuracy of an air/fuel ratio control of an internal-combustion engine increases, and discharge of a toxic substance comes to be suppressed effectively.

In addition, the procedure expressed by the above-mentioned respective steps can be performed by an algorithm stored in an electrical control unit (ECU) which an FFV to which a purge method according to the second embodiment of the present invention is applied comprises, similarly to the first embodiment of the present invention. Specifically, for example, a program corresponding to the procedure expressed by the above-mentioned respective steps and a relation between the remaining fuel amount presumed by the remaining fuel amount presumption means and the timing of opening and closing of an intake valve corresponding to the remaining fuel amount have been memorized in a memory means (for example, ROM, HDD, etc.) with which the ECU is equipped, the ECU receives a detection signal (output signal) from the alcohol concentration detection means through an input port etc. and presumes the remaining fuel amount based on the detection signal and determines a suitable timing of opening and closing of an intake valve from the above-mentioned relation based on the remaining fuel amount thus presumed, and transmits a control signal (direction signal) corresponding to the timing of opening and closing through an output port etc. from the ECU to the variable valve timing mechanism, and the variable valve timing mechanism adjusts the timing of opening an intake valve to suppress the change of the concentration of the fuel vapor contained in purge gas and the ratio of the alcohol component in the fuel vapor.

Figure 6:
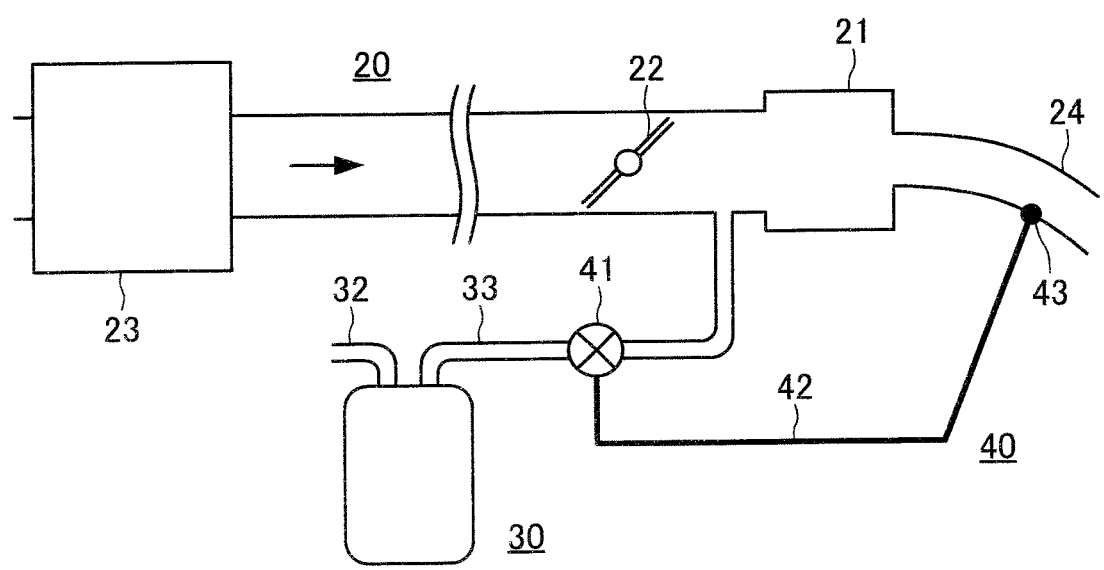
FIG. 6 A schematic view showing a purge mechanism of a canister according to another embodiment of the present invention.

In addition, in the present embodiment, for example, as shown in FIG. 6, a second purge line (the second purge line 42) that branches from a vacuum switching valve (VSV) 41 interposed in the above-mentioned purge line 33 and is communicated with an intake system 20 of an internal-combustion engine may be further provided in addition to the above-mentioned purge line 33. In this case, for example, the above-mentioned purge line 33 may be communicated with the surge tank 21 in the intake system 20 or an upstream position rather than the surge tank 21, and the second purge line 42 may be communicated with a downstream position rather than the surge tank 21 in the intake system 20 (for example, purge port 43). Moreover, the above-mentioned VSV 41 may be configured so that either one of the above-mentioned purge line 33 or the second purge line 42 may be opened at the time of a purge processing, or it may be configured so that both the above-mentioned purge line 33 and the second purge line 42 may be opened at the time of a purge processing.

Furthermore, as a means to adjust the desorption rate of the fuel vapor adsorbed by (adsorption material inside) a canister according to the alcohol concentration (and the remaining fuel amount presumed from the alcohol concentration) detected by an alcohol concentration detection means, a canister throttle control means and a variable valve timing mechanism are adopted in said first embodiment and said second embodiment of the present invention, respectively. However, as a means to adjust the desorption rate of the fuel vapor adsorbed by (adsorption material inside) a canister according to the alcohol concentration (and the remaining fuel amount presumed from the alcohol concentration) detected by an alcohol concentration detection means, both a canister throttle control means and a variable valve timing mechanism may be used in combination.

Namely, the third embodiment of the present invention is,
a purge method of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine, and
a canister which comprises a purge line being a pathway communicated with an intake system of said internal-combustion engine, a tank line being a pathway communicated with said fuel tank, and an air line communicated with the external world, and houses adsorbent therein, and
a variable valve timing mechanism which changes the timing of opening and closing of an intake valve, and
characterized in that:
said FFV further comprises;
a canister throttle control means to control the size of a tank side channel which is a channel inside said canister near the connection section with said tank line,
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and
said method includes;
an alcohol concentration detection step in which the alcohol concentration in the alcohol blended fuel stored in said fuel tank is detected by said alcohol concentration detection means,
a remaining fuel amount presumption step in which said remaining fuel amount is presumed by said remaining fuel amount presumption means based on said alcohol concentration, and
a canister throttle control step in which said tank side channel is adjusted by said canister throttle control means so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become, and a valve timing control step in which the timing of opening of said intake valve is adjusted by said variable valve timing mechanism so that the larger the remaining fuel amount presumed in said remaining fuel amount presumption step is, the later the timing of opening of said intake valve should become, while the smaller the remaining fuel amount presumed in said remaining fuel amount presumption step is, the earlier the timing of opening of said intake valve should become.

As mentioned above, in the present embodiment, as a means to adjust the desorption rate of the fuel vapor adsorbed by (adsorption material inside) a canister according to the alcohol concentration (and the remaining fuel amount presumed from the alcohol concentration) detected by an alcohol concentration detection means, both a canister throttle control means and a variable valve timing mechanism are used in combination. Thereby, when the alcohol concentration (and the remaining fuel amount presumed from the alcohol concentration) detected by the above-mentioned alcohol concentration detection means is high, by narrowing the cross-sectional area of the gas channel near the connection section with the tank line in the canister, a canister throttle control means increases the flow velocity of the purge gas in the portion and, in addition, the above-mentioned variable valve timing mechanism delays the timing of opening of an intake valve and generates negative pressure in a combustion chamber of an internal-combustion engine (inside of a cylinder) to further increase the flow velocity of the purge gas. As a result, since the flow velocity of the purge gas increases largely, the desorption rate of fuel vapor from the adsorption material housed in the canister also increases largely. As a result, in the present embodiment, the changes of the concentration of fuel vapor in the purge gas and/or the ratio of the alcohol component in fuel vapor in the purge gas resulting from high polarity of an alcohol component is suppressed largely, a further more accurate air/fuel ratio control becomes possible, and emission suppression and evaporative emission suppression are performed further more effectively.

Figure 7:
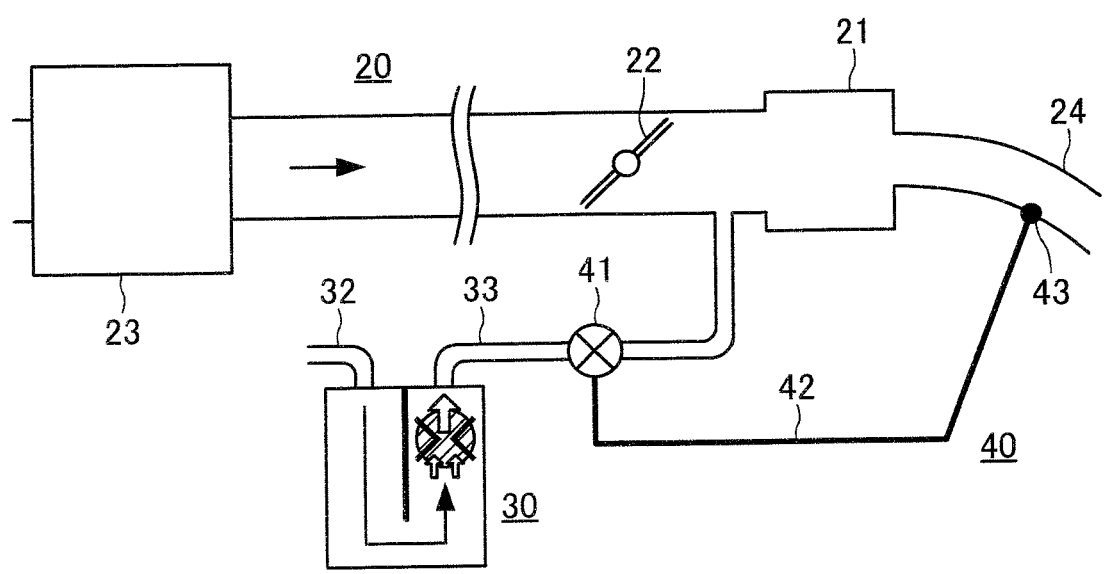
FIG. 7 A schematic view showing a purge mechanism of a canister according to still another embodiment of the present invention.

In addition, as for the schematic structure of a purge mechanism of a canister according to the present embodiment is shown in FIG. 7. As shown in FIG. 7, a purge mechanism of a canister according to the present embodiment is not only equipped with a variable valve timing mechanism (not shown) similarly to the embodiment shown in FIG. 6, but also is equipped with the canister 30 comprising a canister throttle control means. However, although the second purge system 40 containing the second purge line 42 which branches from the vacuum switching change valve 41 interposed in the purge line 33 and is communicated with the purge port 43 in the intake system 20 of an internal-combustion engine is shown in FIG. 7, it should be understood that the second purge system 40 is not an indispensable component in the present embodiment and the configuration shown in FIG. 7 is an exemplification of a modification of the present embodiment.

By the way, in the above-mentioned embodiments, as a means to adjust the desorption rate of the fuel vapor adsorbed by (adsorption material inside) a canister according to the alcohol concentration (and the remaining fuel amount presumed from the alcohol concentration) detected by an alcohol concentration detection means, a canister throttle control means and/or a variable valve timing mechanism are adopted. All these means raise the inhalation resistance of an internal-combustion engine, and therefore they are not necessarily desirable from a viewpoint of heightening the efficiency and the output of an internal-combustion engine. Therefore, as for adjustment of the desorption rate of fuel vapor from the adsorption material by these means, it is desirable to be limited as much as possible only to a situation where such an adjustment is needed. Specifically, as long as the amount of the fuel which will remain adsorbed by adsorption material without being desorbed from the adsorption material (remaining fuel amount) when a purge processing is performed in an FFV according to a conventional technology which adopts neither a canister throttle control means nor a variable valve timing mechanism stay substantially at the same level as that in the case where a conventional fuel containing no alcohol component, such as gasoline, is used, it is more desirable to be controlled so that neither a canister throttle control step nor a valve timing control step as mentioned above is performed.

Therefore, the fourth embodiment of the present invention is, a purge method of a canister in an FFV according to any one of said first to third embodiments of the present invention, characterized in that:

said canister throttle control step and/or said valve timing control step are not performed when the remaining fuel amount presumed in said remaining fuel remaining fuel amount presumption step is a predetermined value or less.

The above-mentioned predetermined value refers to a value which is judged to be substantially at the same level as the amount of the fuel which will remain adsorbed by adsorption material without being desorbed from the adsorption material (remaining fuel amount) at the time of execution of a purge processing of a canister in the case where a conventional fuel not containing an alcohol component, such as gasoline, is used in an FFV according to a conventional technology which adopts neither a canister throttle control means nor a variable valve timing mechanism as mentioned above. Here, "being substantially at the same level" refers to, for example, a level at which the aggravation of emission suppression resulting from the increase in the remaining fuel amount is not recognized substantially.

Therefore, for example, the above-mentioned predetermined value can be determined by previously investigating the change of the remaining fuel amount to the change of an alcohol concentration in alcohol blended fuel through a prior experiment etc., acquiring the maximum value of the remaining fuel amount in a situation where the change of the remaining fuel amount is small and the aggravation of the emission suppression resulting from the increase in the remaining fuel amount is not substantially recognized, and setting the maximum value as the above-mentioned predetermined value.

As mentioned above, in the present invention, when the remaining fuel amount presumed in the remaining fuel amount presumption step in the present embodiment is the predetermined value or less, since a canister throttle control step and/or a valve timing control step are not performed, while suppressing demerits, such as falls of an efficiency and/or output of an internal-combustion engine accompanying increase of the inhalation resistance of the internal-combustion engine to the minimum, the changes of the concentration of fuel vapor in the purge gas and/or the ratio of the alcohol component in fuel vapor in the purge gas resulting from high polarity of the alcohol component is suppressed, a more accurate air/fuel ratio control becomes possible, and emission suppression and evaporative emission suppression are performed more effectively.

By the way, in a curve obtained by plotting the remaining fuel amount presumed by the above-mentioned remaining fuel amount presumption means to the alcohol concentration in the alcohol blended fuel detected by the above-mentioned alcohol concentration detection means, a point of inflection where the increase in the remaining fuel amount to the increase in alcohol concentration becomes remarkably large is recognized. When alcohol concentration increases beyond this point of inflection, the remaining fuel amount will increase remarkably. As a result, when a purge method according to a conventional technology is performed at such an alcohol concentration, deviation of an air/fuel ratio will increase remarkably, and emission suppression and evaporative emission suppression will get worse remarkably. Therefore, it is rational to adopt the remaining fuel amount equivalent to such a point of inflection as a predetermined value in a purge method of a canister in an FFV according to said fourth embodiment of the present invention.

Namely, the fifth embodiment of the present invention is, a purge method of a canister in an FFV according to said fourth embodiment of the present invention, characterized in that:

the remaining fuel amount at a point of inflection in a curve which expresses the change of said remaining fuel amount to the change of said alcohol concentration is adopted as said predetermined value.

As mentioned above, the above-mentioned point of inflection is a point where the increase in the remaining fuel amount to the increase in alcohol concentration becomes remarkably large in a curve obtained by plotting the remaining fuel amount presumed by the above-mentioned remaining fuel amount presumption means to the alcohol concentration in the alcohol blended fuel detected by the above-mentioned alcohol concentration detection means. When alcohol concentration increases beyond this point of inflection, the remaining fuel amount will increase remarkably and, as a result, when a purge method according to a conventional technology is performed at such an alcohol concentration, deviation of an air/fuel ratio will increase remarkably, and emission suppression and evaporative emission suppression will get worse remarkably.

However, in the present embodiment, since the remaining fuel amount equivalent to such a point of inflection is adopted as a predetermined value in a purge method of a canister in an FFV according to said fourth embodiment of the present invention, a canister throttle control step and/or a valve timing control step are performed in the range of alcohol concentration in which the remaining fuel amount increases remarkably. As a result, in the present embodiment, similarly to said fourth embodiment of the present invention, while suppressing demerits, such as falls of an efficiency and/or output of an internal-combustion engine accompanying increase of the inhalation resistance of the internal-combustion engine to the minimum, the changes of the concentration of fuel vapor in the purge gas and/or the ratio of the alcohol component in fuel vapor in the purge gas resulting from high polarity of the alcohol component is suppressed more precisely, a more accurate air/fuel ratio control becomes possible, and emission suppression and evaporative emission suppression are performed more effectively.

As mentioned above, although some embodiments of a purge method of a canister in an FFV according to the present invention have been explained, the scope of the present invention does not limited to these purge methods, and purge mechanisms which attain these purge methods are also included in the scope of the present invention. As for the details of these purge mechanisms, since they are apparent from the explanation about the purge methods according to respective embodiments which has been so far explained, it will not be explained anew here but only the constituent elements of respective purge mechanisms will be enumerated below.

Namely, the sixth embodiment of the present invention is,
a purge mechanism of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine, and
a canister which comprises a purge line being a pathway communicated with an intake system of said internal-combustion engine, a tank line being a pathway communicated with said fuel tank, and an air line communicated with the external world, and houses adsorbent therein, and
characterized in that:
said FFV further comprises;
a canister throttle control means to control the size of a tank side channel which is a channel inside said canister near the connection section with said tank line,
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and
said canister throttle control means is configured so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

Moreover, the seventh embodiment of the present invention is,
a purge mechanism of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine,
a canister which comprises a purge line being a pathway communicated with an intake system of said internal-combustion engine, a tank line being a pathway communicated with said fuel tank, and an air line communicated with the external world, and houses adsorbent therein, and
a variable valve timing mechanism which changes the timing of opening and closing of an intake valve, and
characterized in that:
said FFV further comprises;
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said variable valve timing mechanism, based on the alcohol concentration detected by said alcohol concentration detection means, and
said variable valve timing mechanism is configured so that the larger the remaining fuel amount presumed in said remaining fuel amount presumption step is, the later the timing of opening of said intake valve should become, while the smaller the remaining fuel amount presumed in said remaining fuel amount presumption step is, the earlier the timing of opening of said intake valve should become.

Furthermore, the eighth embodiment of the present invention is,
a purge mechanism of a canister in an FFV (flexible fuel vehicle), wherein:
said FFV comprises;
an internal-combustion engine which uses alcohol blended fuel as fuel,
a fuel tank which stores the fuel to be supplied to said internal-combustion engine, and
a canister which comprises a purge line being a pathway communicated with an intake system of said internal-combustion engine, a tank line being a pathway communicated with said fuel tank, and an air line communicated with the external world, and houses adsorbent therein, and
a variable valve timing mechanism which changes the timing of opening and closing of an intake valve, and
characterized in that:
said FFV further comprises;
a canister throttle control means to control the size of a tank side channel which is a channel inside said canister near the connection section with said tank line,
an alcohol concentration detection means to detect an alcohol concentration in the alcohol blended fuel stored in said fuel tank, and
a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means,
said canister throttle control means is configured so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become, and
said variable valve timing mechanism is configured so that the larger the remaining fuel amount presumed in said remaining fuel amount presumption step is, the later the timing of opening of said intake valve should become, while the smaller the remaining fuel amount presumed in said remaining fuel amount presumption step is, the earlier the timing of opening of said intake valve should become.

In addition, the ninth embodiment of the present invention is,
a purge mechanism of a canister in an FFV according to any one of said sixth to eighth embodiments of the present invention, characterized in that:
the control of the size of said tank side channel by said canister throttle control means and/or the adjustment of the timing of opening of said intake valve by said variable valve timing mechanism are not performed, when the remaining fuel amount presumed by said remaining fuel amount presumption means is a predetermined value or less.

Furthermore, the tenth embodiment of the present invention is, a purge mechanism of a canister in an FFV according to said ninth embodiment of the present invention, characterized in that:

the remaining fuel amount at a point of inflection in a curve which expresses the change of said remaining fuel amount to the change of said alcohol concentration is adopted as said predetermined value.

As mentioned above, in accordance with a purge method and purge mechanism of a canister in an FFV according to the various embodiments of the present invention, in an FFV on which an internal-combustion engine using alcohol blended fuel is mounted, even when the change of the remaining amount of fuel vapor in the canister accompanying the change of the ratio of an alcohol component in alcohol blended fuel and the uneven concentration distribution of the alcohol component within the canister occur, the desorption rate (the amount of desorption) of fuel vapor from adsorption material in the canister is adjusted by adjusting the size of a tank side channel which is a channel in a canister near the connection section with a connection pathway (tank line) with a fuel tank with a canister throttle control means and/or changing the timing of opening and closing of an intake valve with a variable valve timing mechanism, according to the remaining amount of fuel vapor adsorbed by the adsorption material in the canister. Thereby, the concentration of fuel contained in purge gas is adjusted appropriately, the accuracy of an air/fuel ratio control in the FFV is raised, and discharge of a toxic substance from the FFV is suppressed effectively.

Hereafter, the execution procedure of a purge method of a canister in an FFV according to one of various embodiments of the present invention will be explained referring to an accompanying drawing. However, the explanation described below is just aimed at illustration, and the scope of the present invention should not be interpreted as to be limited to the following explanation.

EXAMPLE

As mentioned above, FIG. 8 is a flow chart showing the flow of a series of processing performed in a purge method of a canister in an FFV according to one embodiment of the present invention. Hereafter, the execution procedure of a purge method of a canister in an FFV according to one embodiment of the present invention will be explained in detail referring to the flow chart. In addition, a series of processing shown in the flow chart can be performed by an electrical control unit (not shown), for example, as an interruption processing for every predetermined crank angle.

Figure 8:
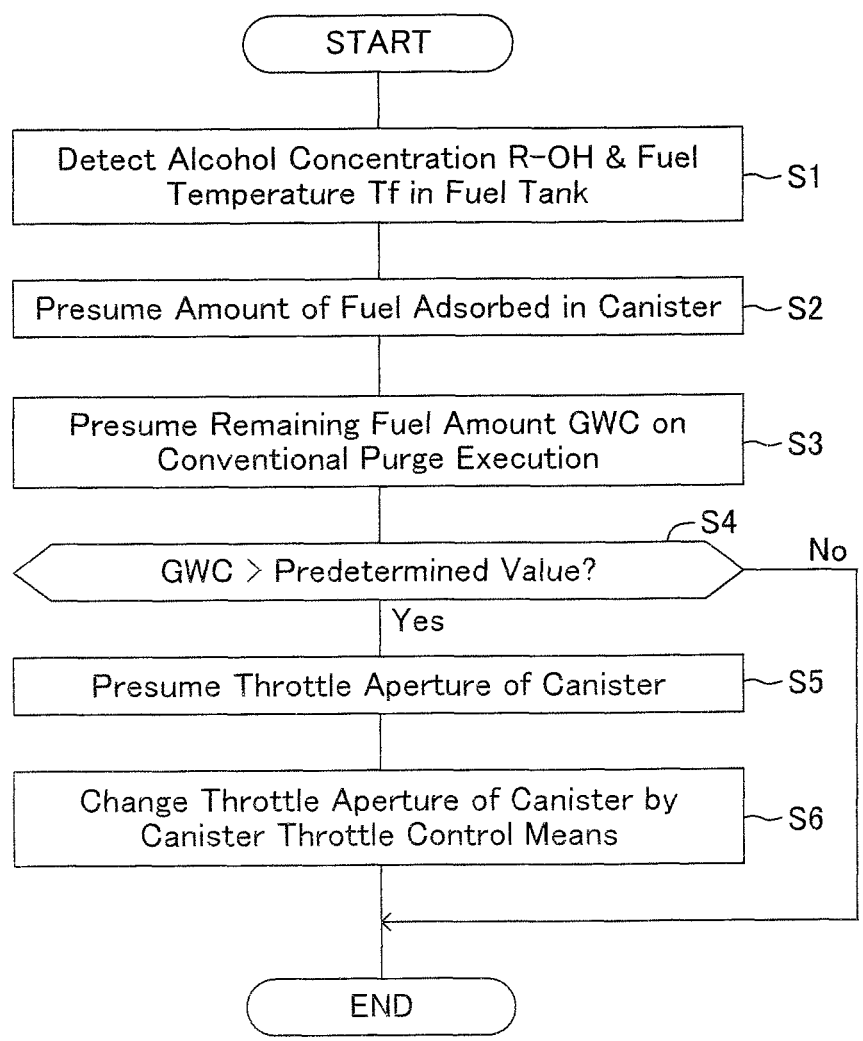
FIG. 8 A flow chart showing the flow of a series of processing performed in a purge method of a canister in an FFV according to one embodiment of the present invention.

As shown in FIG. 8, in the present embodiment, the alcohol concentration R—OH in the alcohol blended fuel stored in a fuel tank is acquired by an alcohol concentration detection means. Moreover, in the present embodiment, the temperature Tf of the alcohol blended fuel stored in the fuel tank is also acquired by detection means, such as a temperature sensor, etc. (Step S1). Next, based on the acquired alcohol concentration R—OH and the fuel temperature Tf and further the adsorption efficiency of adsorption material (for example, activated carbon) housed in the canister, etc., the adsorbed amount of the alcohol blended fuel in (the adsorption material inside) the canister is presumed (Step S2). Furthermore, based on thus presumed adsorbed amount, the remaining amount of fuel which will remain adsorbed by the adsorption material without being desorbed from the adsorption material if a purge processing is performed in an FFV which does not comprise any means for promoting the desorption of the fuel from the adsorption material, such as a canister throttle control means, a variable valve timing mechanism, etc. (remaining fuel amount) GWC is presumed (Step S3).

Subsequently, it is judged whether the remaining fuel amount GWC presumed as mentioned above exceeds a previously determined value (predetermined value) or not (Step S4). When the presumed remaining fuel amount GWC does not exceed the predetermined value (namely, GWC 5 the predetermined value) (Step S4: No), it is judged that there is no necessity to promote the desorption of the fuel from adsorption material at the time of a purge processing, and the present processing is once ended.

In addition, as mentioned above, the above-mentioned "predetermined value" refers to a value which is judged to be substantially at the same level as the amount of the fuel which will remain adsorbed by adsorption material without being desorbed from the adsorption material (remaining fuel amount) at the time of execution of a purge processing in the case where a conventional fuel not containing an alcohol component, such as gasoline, is used in an FFV according to a conventional technology which adopts neither a canister throttle control means nor a variable valve timing mechanism. Such a predetermined value can be determined by previously investigating the change of the remaining fuel amount to the change of an alcohol concentration in alcohol blended fuel through a prior experiment etc., acquiring the maximum value of the remaining fuel amount in a situation where the change of the remaining fuel amount is small and the aggravation of the emission suppression resulting from the increase in the remaining fuel amount is not substantially recognized, and setting the maximum value as the above-mentioned predetermined value.

On the other hand, when the presumed remaining fuel amount GWC exceeds the predetermined value (namely, GWC>predetermined value) (Step S4: Yes), it is judged to be necessary to promote desorption of fuel from adsorption material at the time of a purge processing. In the present embodiment, desorption of fuel from adsorption material is promoted at the time of a purge processing by adjusting the throttle aperture of a canister with a canister throttle control means.

Therefore, as mentioned above, the throttle aperture of a canister suitable for suppressing the change of the concentration of fuel vapor contained in purge gas or the ratio of an alcohol component in the fuel vapor is presumed by previously acquiring a relation between the remaining fuel amount presumed by a remaining fuel amount presumption means and the throttle aperture of a canister throttle control means according to the remaining fuel amount through a prior experiment etc., and referring to the relation based on a presumed remaining fuel amount (Step S5).

Next, for example, by operating a canister throttle control means through a control signal etc. transmitted from an electrical control unit so that the throttle aperture as presumed above may be attained, the throttle aperture of the canister is adjusted (Step S6), and the present processing is once ended.

In the present embodiment, as mentioned above, the throttle aperture of a canister is adjusted according to the remaining fuel amount presumed based on alcohol concentration in alcohol blended fuel, etc. and, thereby, the desorption rate (the amount of desorption) of fuel vapor from adsorption material in the canister is adjusted. As a result, the change of the concentration of fuel contained in purge gas is suppressed, and even when the change of the remaining amount of the fuel vapor adsorbed by the adsorption material in the canister or an uneven concentration distribution of an alcohol component within the canister occur, a highly precise air/fuel Ratio control is attained, and discharge of a toxic substance is suppressed effectively.

In addition, although not indicated in the flow chart shown in FIG. 8, prior to the execution of the above-mentioned series of processing, judgments such as a judgment on whether the operating condition of a fuel system based on the temperature of a coolant (for example, cooling water etc.) of an internal-combustion engine and the air content inhaled and/or exhausted by an internal-combustion engine after the last purge processing has been learned or not, a judgment on whether a purge processing based on whether the temperature of the coolant (for example, cooling water etc.) of the internal-combustion engine has reached the temperature which may produce a situation where a purge processing should be performed and whether the above-mentioned fuel system learning has been already performed in any or all of the operating ranges of the internal-combustion engine has been already performed or not, may be carried out, and a conditional branch, which determines whether the above-mentioned series of processing should be performed according to these judgment results, may be provided.

Although a specific working example which has a combination of specific configuration and execution procedure has been explained as mentioned above for the purpose of explaining the present invention, the scope of the present invention is not limited to such an exemplary embodiment, and modifications can be properly added within the limits of the matter described in the claims and the specification.

REFERENCE SIGNS LIST

10: fuel tank, 11: fuel cap, 12: inlet pipe, 13: fuel, 20: intake system, 21: surge tank, 22: throttle valve, 23: air cleaner, 24: intake manifold, 30: canister, 31: tank line, 32: air line, 33: purge line, 35: canister throttle control means, 36: alcoholic high concentration domain, 37: alcoholic intermediate concentration domain, 38: alcoholic low concentration domain, 40: second purge system, 41: vacuum switching valve (VSV), 42: second purge line, and 43: second purge port.

The invention claimed is:

1. A purge method of a canister in an FFV (flexible fuel vehicle), wherein:
    said FFV comprises;
        an internal-combustion engine which uses alcohol blended fuel as fuel,
        a fuel tank which stores the fuel to be supplied to said internal-combustion engine, and
        a canister which comprises a purge line being a pathway communicated with an intake system of said internal-combustion engine, a tank line being a pathway communicated with said fuel tank, and an air line communicated with the external world, and houses adsorbent therein, and
    characterized in that:
    said FFV further comprises;
        a canister throttle control means to control the size of a tank side channel which is a channel inside said canister near the connection section with said tank line,
        an alcohol concentration detection means to detect an alcohol concentration in the alcohol blended fuel stored in said fuel tank, and
        a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and
    said method includes;
        an alcohol concentration detection step in which the alcohol concentration in the alcohol blended fuel stored in said fuel tank is detected by said alcohol concentration detection means,
        a remaining fuel amount presumption step in which said remaining fuel amount is presumed by said remaining fuel amount presumption means based on said alcohol concentration, and
        a canister throttle control step in which said tank side channel is adjusted by said canister throttle control means so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

2. A purge method of a canister in an FFV according to claim 1, characterized in that:
    said canister throttle control step and/or said valve timing control step are not performed when the remaining fuel amount presumed in said fuel remaining fuel amount presumption step is a predetermined value or less.

3. A purge method of a canister in an FFV according to claim 2, characterized in that:
    the remaining fuel amount at a point of inflection in a curve which expresses the change of said remaining fuel amount to the change of said alcohol concentration is adopted as said predetermined value.

4. A purge method of a canister in an FFV (flexible fuel vehicle), wherein:
    said FFV comprises;
        an internal-combustion engine which uses alcohol blended fuel as fuel,
        a fuel tank which stores the fuel to be supplied to said internal-combustion engine, and
        a canister which comprises a purge line being a pathway communicated with an intake system of said internal-combustion engine, a tank line being a pathway communicated with said fuel tank, and an air line communicated with the external world, and houses adsorbent therein, and
        a variable valve timing mechanism which changes the timing of opening and closing of an intake valve, and
    characterized in that:
    said FFV further comprises;
        a canister throttle control means to control the size of a tank side channel which is a channel inside said canister near the connection section with said tank line,
        an alcohol concentration detection means to detect an alcohol concentration in the alcohol blended fuel stored in said fuel tank, and
        a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and said method includes;
- an alcohol concentration detection step in which the alcohol concentration in the alcohol blended fuel stored in said fuel tank is detected by said alcohol concentration detection means,
- a remaining fuel amount presumption step in which said remaining fuel amount is presumed by said remaining fuel amount presumption means based on said alcohol concentration, and
- a canister throttle control step in which said tank side channel is adjusted by said canister throttle control means so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become, and
- a valve timing control step in which the timing of opening of said intake valve is adjusted by said variable valve timing mechanism so that the larger the remaining fuel amount presumed in said remaining fuel amount presumption step is, the later the timing of opening of said intake valve should become, while the smaller the remaining fuel amount presumed in said remaining fuel amount presumption step is, the earlier the timing of opening of said intake valve should become.

5. A purge mechanism of a canister in an FFV (flexible fuel vehicle), wherein:
said FFV comprises;
- an internal-combustion engine which uses alcohol blended fuel as fuel,
- a fuel tank which stores the fuel to be supplied to said internal-combustion engine, and
- a canister which comprises a purge line being a pathway communicated with an intake system of said internal-combustion engine, a tank line being a pathway communicated with said fuel tank, and an air line communicated with the external world, and houses adsorbent therein, and characterized in that:
said FFV further comprises;
- a canister throttle control means to control the size of a tank side channel which is a channel inside said canister near the connection section with said tank line,
- an alcohol concentration detection means to detect an alcohol concentration in the alcohol blended fuel stored in said fuel tank, and
- a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, and said canister throttle control means is configured so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become.

6. A purge mechanism of a canister in an FFV according to claim 5, characterized in that:
the control of the size of said tank side channel by said canister throttle control means and/or the adjustment of the timing of opening of said intake valve by said variable valve timing mechanism are not performed, when the remaining fuel amount presumed by said remaining fuel amount presumption means is a predetermined value or less.

7. A purge mechanism of a canister in an FFV according to claim 6, characterized in that:
the remaining fuel amount at a point of inflection in a curve which expresses the change of said remaining fuel amount to the change of said alcohol concentration is adopted as said predetermined value.

8. A purge mechanism of a canister in an FFV (flexible fuel vehicle), wherein:
said FFV comprises;
- an internal-combustion engine which uses alcohol blended fuel as fuel,
- a fuel tank which stores the fuel to be supplied to said internal-combustion engine, and
- a canister which comprises a purge line being a pathway communicated with an intake system of said internal-combustion engine, a tank line being a pathway communicated with said fuel tank, and an air line communicated with the external world, and houses adsorbent therein, and
- a variable valve timing mechanism which changes the timing of opening and closing of an intake valve, and characterized in that:
said FFV further comprises;
- a canister throttle control means to control the size of a tank side channel which is a channel inside said canister near the connection section with said tank line,
- an alcohol concentration detection means to detect an alcohol concentration in the alcohol blended fuel stored in said fuel tank, and
- a remaining fuel amount presumption means to presume a remaining fuel amount which is the amount of the fuel which will remain adsorbed by said adsorption material without being desorbed from said adsorption material if a purge processing is performed in an FFV which does not comprise said canister throttle control means, based on the alcohol concentration detected by said alcohol concentration detection means, said canister throttle control means is configured so that the larger the remaining fuel amount presumed in said remaining fuel amount presumption step is, the wider said tank side channel should become, while the smaller the remaining fuel amount presumed in said remaining fuel amount presumption step is, the narrower said tank side channel should become, and said variable valve timing mechanism is configured so that the larger the remaining fuel amount presumed in said remaining fuel amount presumption step is, the later the timing of opening of said intake valve should become, while the smaller the remaining fuel amount presumed in said remaining fuel amount presumption step is, the earlier the timing of opening of said intake valve should become.

* * * * *